May 23, 1972  E. CAMERON  3,664,738
APPARATUS FOR CONTINUOUS CONTACT PRINTING
Filed Jan. 9, 1970  2 Sheets-Sheet 1

INVENTOR
EWEN CAMERON

ATTORNEY

3,664,738
APPARATUS FOR CONTINUOUS CONTACT PRINTING
Ewen Cameron, Herongate, near Brentwood, England, assignor to Columbia Broadcasting System Inc., New York, N.Y.
Filed Jan. 9, 1970, Ser. No. 1,594
Claims priority, application Great Britain, Jan. 13, 1969, 1,941/69
Int. Cl. G03b 27/20
U.S. Cl. 355—87
13 Claims

ABSTRACT OF THE DISCLOSURE

Apparatus and method for contact printing which comprises moving a transparency web and a web of photosensitive print material together in close contact and at a substantially uniform speed past an exposure position at which the print material is exposed to light passing through the transparency web, providing a liquid layer between the webs to establish optical contact between them, and applying fluid pressure to press the webs together, the fluid pressure being greatest at a position where the webs have been brought together via the liquid layer and before they have reached the exposure position.

BACKGROUND OF THE INVENTION

This invention relates to method for continuous photographic contact printing and apparatus for carrying out the method.

Continuous photographic contact printing apparatus is used, for example in the production of a copy positive cine film from a master negative; the negative comprising negative images arranged sequentially on a web of transparent film material. In one method of using a continuous photographic contact printing apparatus for this purpose a web of photosensitive film material and the master negative are fed continuously together, in close contact, past an exposure point; the negative material being nearest to the light source. In this way the photosensitive material is exposed through the negative. A series of positive latent images is formed on the photosensitive material and these may be developed to form a positive cine film. Usually the exposure means comprises a light source in an enclosed lamp-house, having an aperture through which light from the light source exposes the photosensitive material. An axis of the aperture lies transversely across the path of the two webs and at the exposure point there is means for supporting the two webs of film material. In such a method of printing it is important that there should be no relative movement between the two webs and that they are in as close a contact as possible when they are at the exposure point. It is important also that the effects of scratch marks which may be present on the master negative and on the photosensitive side of the photosensitive material are minimized. Such scratch marks can scatter the exposure light and cause unsharp images on the developed positive film or can be reproduced as dark or light lines.

Continuous photographic contact printing apparatus may be used in the printing of duplicates other than cine films and in particular may be used when the master is a positive and a direct positive photosensitive material is used as the film stock, on which to produce the duplicate. However, whatever master or film stock is used it is important that during exposure the master and the photosensitive film stock are in as close contact as possible, that relative movement be avoided and that the effect of scratch marks on either the master or the film stock is minimized.

A thin layer of a transparent liquid of refractive index close to that of the photosensitive emulsion medium and/or the film base may be provided between the contacting surfaces to fill the scratches and so to eliminate the shadow and scatter which the untreated scratches produce. Suitable contactant liquids for this purpose are known and used in continuous contact printing.

It is preferred that the thickness of the liquid interlayer between the films should be small in order to limit image spread and it is found that reduction of this liquid interlayer to very small values increases mechanical coupling between the webs and so inhibits both tangential and radial relative movement between them.

It is the object of the present invention to provide a method of continuously contact-printing photographic material wherein the web surfaces are in close contact with a minimum of relative movement during exposure and wherein the effect of scratch marks is minimized. It is also the object of the present invention to provide apparatus for carrying out the method of the invention.

SUMMARY OF THE INVENTION

According to the present invention, there is provided a method of printing images carried by a transparency web to form corresponding images on a web of photosensitive print material, which comprises causing said transparency web and print material to move together in close contact and at a substantially uniform speed past an exposure position at which the print material is exposed to light passing through the transparency web, providing a liquid layer between said webs to establish optical contact between them, and applying fluid pressure to press said webs together, said fluid pressure being greatest at a position before the exposure position.

It is preferred that the fluid pressure is applied by a liquid which is the same liquid which is used to provide optical contact between the two webs and it is preferred that the exposure position is below the surface of this liquid.

Using the method of the present invention the two webs are in very close contact at the exposure position, there being a minimal thickness of contactant liquid between them. The effort of applying the maximum pressure to the webs before they reach the exposure position is to squeeze most of the contactant liquid from between the two webs to form an interlayer of liquid of minimal thickness. If a relatively thick interlayer of liquid is present between the two webs when they are passing the exposure position it prevents close contact of the two webs and provides conditions favouring relative motion between the webs due to the reduction in friction between them.

In one preferred embodiment using the method of the present invention the two webs are caused to converge under the surface of a body of contactant liquid, the webs are then carried by supporting means at a predetermined speed through a region of steeply increasing fluid pressure, followed by a region of constant pressure and then a region wherein the pressure gradually decreases to constant ambient pressure, the last said region being before the exposure position.

It is preferred that fluid pressure is applied to the webs by use of a pad which is aligned parallel to the path of the supported webs. The surface of the said pad is perforated by a number of orifices through which liquid is forced.

According to another aspect of the present invention there is provided an apparatus for printing images carried by a transparency web to form corresponding images on a web of photosensitive print material, which comprises an exposure station, means for bringing the two webs together, means for supporting the webs and carrying them in close contact and at a uniform speed in a path past the exposure station, means for producing a liquid interlayer between the two webs and means for applying a fluid pressure to press the two webs together, the said pressure applying means being located along the path of the webs at a position after they have been brought together but before the exposure station.

In one preferred form of this aspect of the present invention the two webs are guided on to a rotating cylinder which is wholly or partially immersed in the interlayer liquid so that one web is overlaid by the other web for a sufficient length of lap to locate them relative to one another and to the exposure station over which they pass while in the liquid. The exposure station preferably comprises a source of light in a housing provided with an exit slot or aperture for the light. It is preferred that the inner web should be the web of photosensitive material and should meet the surface of the drum above the surface of the liquid, and that the outer web, i.e., the web which carries the negative image approaches the cylinder already lapped by the inner web tangentially thereto under the liquid surface. It has been found that the surfaces of the webs are easily wetted and an interlayer of the contactant liquid is formed between the overlapping webs when the webs approach each other in this way.

It is preferred that fluid pressure is applied to the overlapping webs at or just after the tangent point where the two webs start to overlap each other. Preferably the fluid pressure is applied by means of a pad mounted to have a surface nearly parallel to the surface of the cylinder at or just beyond the said tangent point, the said pad being positioned close to the webs and having a number of orifices or apertures on its surface which faces the web through which contactant liquid is forced. In a preferred form the apertures are so arranged on the surface of the pad that they form a rectangular figure. This rectangular figure encloses a body of fluid under pressure. It is preferred that the said apertures are so aligned that fluid streams are directed therefrom inwards toward the enclosed fluid body.

The pressure region is formed by momentum change due to abrupt changes in direction of flow of high velocity streams. All flow at the pressure zone open boundary is outwards from the pressure zone, the inwardly directed streams from the orifices impinging on the outer web surface and by interference limiting outflow from the pressure zone.

When use is made of a pressure pad of this type it is preferred that the orifices are so aligned that the pressure rises steeply at the entry boundary of the pressure zone, remains substantially constant for a distance and then gradually drops. A steep pressure rise may be achieved by arranging that a row of orifices is situated on the surface of the pad close to the approach edge thereof. On the other hand the gradual pressure drop may be achieved by arranging that a row of orifices is situated at a distance removed from the departure edge of the pad. Alternatively the gradual pressure drop or gentle negative pressure gradient at the exit boundary may be achieved by the use of smaller orifices or orifices spaced more widely than those at the entry boundary, or arranged in two or more rows.

A steep negative pressure gradient at the exit boundary of the pressure zone tends to produce an instability in web spacing; thus it is preferred to have a gentle negative pressure gradient at the exit boundary. Such instability in this situation is a well known effect, see for example Journal of Basic Engineering, December 1965, pp. 837–846.

In another embodiment of this aspect of the present invention the orifices on the surface of the pad at the entry boundary of the pressure zone are formed in a line obliquely disposed to the moving webs. In still another embodiment the pressure zone at the entry is bounded by two oblique lines forming an angle. These arrangements give a slight flexing of the outer web with an axis in the direction of web travel. The impedance to outflow of excess interlayer liquid is thereby reduced.

It is preferred that the exposure position is under the liquid and that it is so located that the pressure on the two overlapping webs has dropped to the ambient fluid pressure.

A particular use for the method and apparatus of the present invention is in the production of positive prints for use in an attachment to a television receiver. The negative master material in one such product has a web which is 40 mm. wide. On this web are eight parallel series of frames in all of which picture information is present. Each frame is of the order of 2 mm. by 3 mm. and the corresponding positive carries sufficient picture information to produce one television frame. The picture information frames on such master negatives are contact printed onto webs of photosensitive material. Thus during printing it can be seen that it is very important that the optical contact between the two webs is almost perfect and that the effect of scratches on the negative and on the raw film stock is minimized. This is especially so because it is contemplated that the master negative is to be used a very large number of times in the printing process and thus scratches are certain to be produced on it, e.g., merely by the processes of reeling and unreeling.

It has been found that by use of the method and the apparatus of the present invention good prints from a master negative can be produced even after the negative has been used a large number of times. One embodiment of an apparatus which uses the method of the present invention will now be described with reference to its use in the contact printing of a master negative, of the type just described, onto photosensitive material to produce print material.

DESCRIPTION OF THE PREFERRED EMBODIMENT

Figure 1:
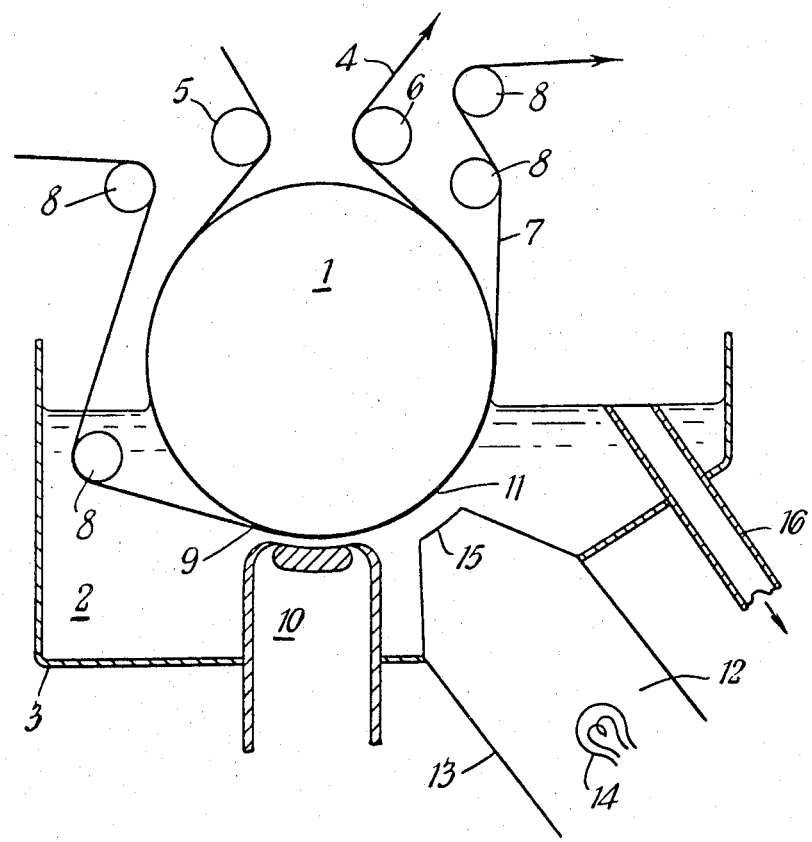
FIG. 1 is a diagrammatic cross-sectional side elevation of a printing apparatus according to the present invention.

In FIG. 1 a rotatable cylinder 1 is partially immersed in liquid 2 which is held in a container 3. Overlapping most of the cylinder 1 is a web of photosensitive material 4. The web 4 fits into an alignment groove on the surface of cylinder 1 and is tensioned around an arc of the cylinder 1 in its alignment groove by the rollers 5 and 6. A web of negative material 7 laps over part of the photosensitive material 4; this web of negative material 7 has a row of sprocket holes along one of its edges and these holes mesh with a peripheral row of teeth (not shown) which are on the surface of the cylinder 1 along one side of the alignment groove. The web 7 is tensioned over the surface of the cylinder 1 by the rollers 8. The portion of the negative which carries the images overlaps the photosensitive material 4 and the portion of the negative 7 which carries the sprocket holds lies over the row of teeth which are along one side of the alignment groove.

Figure 2:
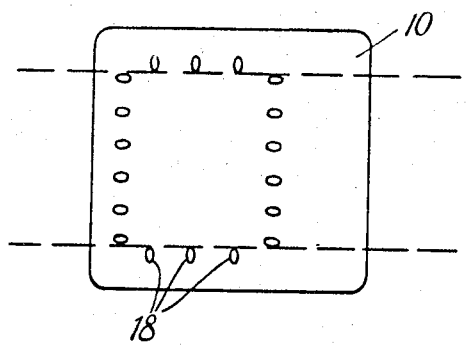
FIG. 2 is a top plan view of a pressure pad showing the location of the jets.
Figure 4:
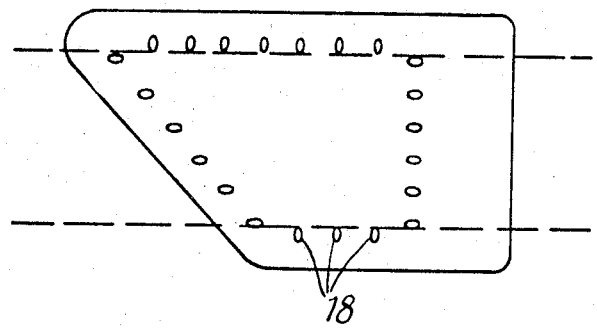
FIGS. 4 and 5 are top plan views of alternative arrangements of orifices on pressure pads.
Figure 5:
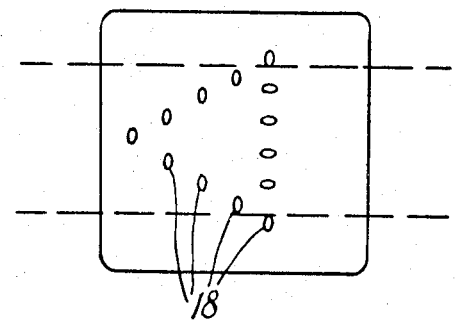

The negative material 7 makes almost tangential contact with the cylinder 1 at point 9. Below the point 9 is located the pressure pad 10, details of which are shown in FIG. 2. Downstream from the pressure pad 10 in the direction of travel of the overlapping webs 4 and 7 is located the exposure area 11. At area 11 the overlapping webs pass close to the exposure apparatus 12. The apparatus 12 consists of a light tunnel 13 which has therein a light source 14 and a light transparent end 15. There is present in the tunnel optical means (not shown) for ensuring that collimated light leaves the exposure apparatus 12. The liquid which is continuously pumped through the pressure pad 10 overflows from the container 3 via the overflow pipe 16, thus ensuring that the liquid level in the container 3 remains constant.

The surface of the pressure pad 10 is shown in FIG. 2. The surface of the pad has a number of orifices in it through which the same liquid present in the container 3 is pumped. The orifices 18 are so arranged that a liquid pressure zone is formed through which the overlapping webs 4 and 7 pass. The position of the overlapping webs 4 and 7 over the pressure pad 10 is indicated by the broken parallel lines which pass over the surface of the pad.

Figure 3:
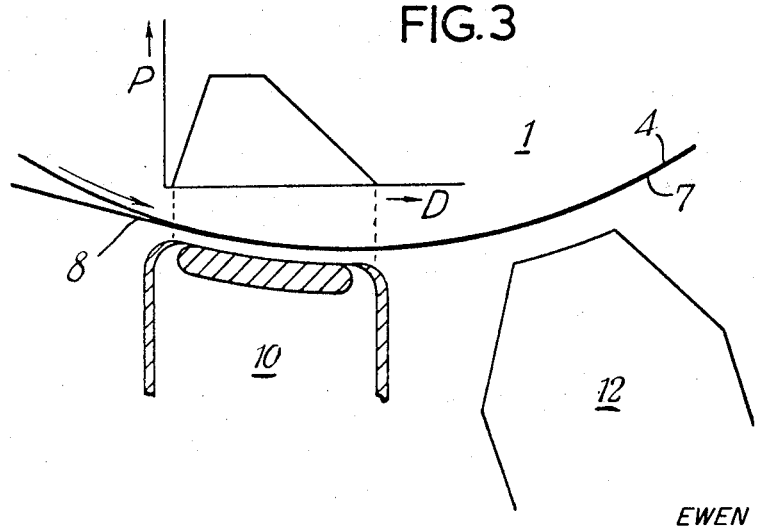
FIG. 3 is an enlarged part of FIG. 1, there being superimposed thereon a graph which shows the change in pressure which occurs over the pressure pad.

FIG. 3 illustrates the pressure zone and shows the entry and exit boundary of this zone. The entry boundary is located at point 9 which is the point where the web 7 starts to lap the cylinder 1. The exit boundary is located at the point above the end of the pressure pad. The liquid pressure outside the pressure zone is the ambient liquid pressure of the liquid 2 present in the container 3.

Table 1 which follows illustrates the relation between the peak pressure in the pressure zone and the interlayer thickness (in microns) obtained using a contact printing apparatus of this type. The contactant liquid viscosity was 0.008 poise, the web speed was 50 cm./second, and the negative film tension 400 g.

TABLE 1

| Pressure, lb./sq. inch: | Interlayer thickness, $\mu$m. |
| --- | --- |
| 0 | 25 |
| 1 | 17 |
| 2 | 12 |
| 3 | 9.5 |
| 4 | 8.0 |
| 4.7 | 7.2 |
| 5.0 | 7.0 |
| 6.0 | 6.5 |
| 10 | 5.0 |

In operation, a blank leader attached to the web 4 is threaded over the roller 5 and over the cylinder 1 so that it lies in the alignment groove and then over the roller 6. A blank leader attached to the negative web 7 is threaded over the first two rollers 8 and then over the cylinder 1 so that its sprocket holes fit over the peripheral row of teeth, then over the remaining rollers 8. The container 3 is then filled up to the level of its overflow pipe with the liquid 2. The rollers 5, 6 and 8 are then adjusted so that both webs are under a slight tension. The printer is then ready.

The cylinder is slowly rotated, pulling the two webs 4 and 7 at a uniform speed. The webs 4 and 7 after having passed out of the container 1 are reeled up on driven stock rollers (not shown).

Liquid 2 is forced out of the pressure pad 10 through the orifices in its top surface. This creates a pressure zone through which the two webs pass. The path of the webs is through the pressure zone and then past the exposure area 11. At this point the light from the exposure apparatus 12 passes through the negative web 7 and imagewise exposes the photosensitive web 4. After exposure the two webs are separated and web 4 is processed to produce the positive images thereon.

It is preferred that the webs are not separated until they are no longer immersed in the liquid. This ensures that the liquid carried out of the container on the web surfaces is a minimum.

In operation, as the moving web 7 approaches the web 4 which is lapped on the rotating cylinder 1 an interlayer of liquid is formed between the two webs. Then as the webs converge and finally overlap liquid is forced out of this interlayer. The effect of the pressure zone is to increase the amount of liquid which is forced out of the interlayer. When the moving webs have passed through the pressure zone they are in very close contact but because the pressure is at the ambient pressure no more liquid is forced out of the liquid interlayer. Thus when the two webs in close contact pass the exposure position they are in close optical contact and relative movement between them is substantially eliminated and the distance between them does not vary while the whole length of the webs is passing the exposure position.

In one modification of the printer just described there is provided an air blower or other drying means for drying the surface of the rotating cylinder. This drying means is located out of the liquid and preferably between the rollers 5 and 6. By use of this drying means the surface of the cylinder is kept dry and this improves the traction exerted by the cylinder on the web of photosensitive material 4.

In another modification to the apparatus just described radial light converging to the center of curvature of the supporting cylinder 1 may be used for the exposure instead of collimated light.

In order to aid the understanding of the invention, and in particular of the preferred embodiment of the apparatus of the present invention, it is necesary to consider briefly the theoretical principles which, it is believed, are involved in the invention.

When considering the apparatus just described the liquid channel formed between the two flexible webs is of rectangular section with a small dimension from web to web and a much greater dimension across the width of the web. The channel section is sufficiently small to preserve streamline flow at the existing velocities.

In the channel if the two webs move in the x–y plane only and if the angle between them is small at all points in the region, then at any plane through x normal to the flow direction the gradients can be shown to be related:

$$\mu \frac{d^2v}{dy^2} = \frac{dP}{dx} + \rho \frac{dv}{dt} \quad (1)$$

where y is normal to the mean axis and is measured from one web surface, x is distance along the flow mean axis and P is liquid pressure at the normal plane through x. The quanties $\rho$, $v$ and $\mu$ are respectively liquid density, velocity along the x axis and liquid viscosity. The x-coordinate has postitive values increasing in the direction of web transport and the webs both move at a speed V.

In the range for which the conditions apply that $dP/dx$ is invariable with y so also is $dv/dt$ and if v is liquid mean velocity, the flow of Q relative to a stationary plane normal to the axis of the channel is:

$$Q = \bar{v}a$$

per unit width, where $a$ is the space between the web surfaces (the interlayer) at the plane, i.e., $$Q = Va - \frac{a^3}{12\mu}\left[\frac{dP}{dx} + \rho\frac{dv}{dt}\right] \quad (2)$$

This is true for close spacing, streamline flow and curvature of boundary surfaces on axes parallel to the z axis only.

Large values of $dP/dx$ are present in the apparatus of the present invention and in using Equation 2 as a guide the pressure changes arising from velocity changes can be initially ignored; that is, the component $$\frac{dP}{dx} = \frac{\rho}{2}[v_2^2 - v_1^2]$$

may be neglected.

Accordingly, for the present purpose it is taken as sufficiently accurate to write:

$$Q = Va - \frac{a^3}{12\mu} \cdot \frac{dP}{dx} \quad (3)$$

Since the channel boundaries, i.e., the webs, are flexible the pressure differences and pressure gradients inside the channel are very nearly the same as those outside.

The condition in the present invention relates to the steady state to which flow, pressure and spacing converge, and so the intermediate transient values may be ignored. The situation considered is that where V is fixed, $dP/dx$ is fixed and Q is invariable with $x$.

This supposes that a steady condition is reached when Q is constant; i.e., there is no further input to and no leakage from the channel formed between the two web surfaces. This condition extends from a spacing $a$ to other $a$ values. That is, $$dQ/da = 0$$

Letting $dP$ be constant (this is fixed by the geometry of the pressure pad), then in Equation 3, $$\frac{dQ}{da} = V - \frac{a^2}{4\mu} \cdot \frac{dP}{dx} = 0$$

$$\therefore a = 2 \left[ \frac{\mu V}{\frac{dP}{dx}} \right]^{1/2} \quad (4)$$

This is the steady condition in the steeply rising pressure region, and in this phase let $a = a_1$; then from Equations 4 and 3

$$Q = 2/3 V a_1 \quad (5)$$

At a later stage $dP/dx$ is brought to zero, i.e., P has any constant value, and from Equation 3 if $a$ is now $a_2$, $$Q = V a_2 \quad (6)$$

Hence since Q is constant, $$Q = \tfrac{2}{3} V a_1 = V a_2$$

$$\therefore a_2 = \tfrac{2}{3} a_1$$

and from Equation 4 it follows that $$a_2 = \frac{4}{3} \left[ \frac{\mu V}{\frac{dP}{dx}} \right]^{1/2} \quad (7)$$

where $a_2$ is the steady state interlayer thickness.

It is true that a subsequent negative pressure gradient will increase the liquid interlayer velocity to a value greater than V so that the spacing $a$ is reduced to a value even lower than $a_2$, but since the falling pressure region is unstable it is preferred not to make the exposure during a phase of falling pressure.

Accordingly a region of zero pressure gradient is best for making the exposure.

It is apparent from Equation 7 that the major factor in producing close spacing is the pressure gradient $dP/dx$.

Therefore in the present invention when fluid pressure is used to bring the two webs as close together as possible it is preferred to use a fluid pressure applying means of such a design that the body of fluid under pressure has a high positive pressure gradient at its web entry boundary. However, to make the high pressure gradient exist within the interlayer requires that the ingoing boundary of the pressure zone should be in the region of the initial approach of the web surfaces, i.e., near to the tangent point.

If the ingoing pressure zone boundary is situated later, then either the webs bulge apart immediately before entering the pressure zone, or else the pressure gradient extends for some distance back along the channel formed between the two films. Of these two results the bulging or local separation is objectionable by reason of the disturbance it causes. The second is objectionable because it increases the length over which the pressure rise takes place within the channel thus reducing the effective pressure gradient. To avoid these objectionable features the ingoing boundary of the fluid pressure zone thus is preferably of high pressure gradient and is situated near to the tangent point.

It has been shown that a region of constant pressure is required for making the exposure. The difference in time required to take up the conditions of Equation 6 after the necessary conditions of Equation 5 is a short time and the movement from $a_1$ to $a_2$ is small. However, to obtain the high resolving power which is required, and since one or both of the webs may be required to locate edgewise against solid guiding surfaces or even to engage perforations on sprocket teeth (as in the apparatus just described) it has been found desirable to locate the exposure aperture at ambient pressure and some distance after the pressure zone and so to allow the exposure to be made in a region free of disturbing movements.

To minimize the negative pressure gradient instability, the negative pressure gradient is preferably small; i.e., of the order of one tenth of the ingoing positive pressure gradient.

I claim:

1. Apparatus for contact printing comprising, in combination,
   a tank containing liquid,
   means including a cylinder rotatable on a horizontal axis and at least partially submerged in said liquid for transporting a web of photosensitive print material in contact therewith and a transparency web in close contact with said print material through said liquid at substantially the same speed past an exposure position,
   means at said exposure position for directing light through said transparency web to expose said print material, and
   a pad having a surface spaced from and parallel to the path of travel of said webs and confronting said drum at a position in advance of said exposure position along the path of travel of said webs, the surface of said pad having a plurality of orifices therein through which liquid is forced for establishing at said position a region of predetermined fluid pressure higher than the ambient pressure of the liquid in said tank followed by a region wherein the pressure decreases to said ambient pressure, for providing a liquid layer between said webs to establish optical contact between them as they pass said exposure position.

2. Apparatus in accordance with claim 1 wherein said pad has a generally rectangular surface of a width at least as great as the width of said webs, and said plurality of orifices are arranged in a pattern to establish at said position a region of steeply increasing fluid pressure followed by a region of substantially constant pressure followed, in turn, by a region wherein the pressure decreases to said ambient pressure.

3. Apparatus in accordance with claim 1 wherein the liquid contained in said tank is forced through said orifice.

4. Apparatus in accordance with claim 2 wherein said exposure position is disposed below the surface of the liquid in said tank and is located at a position where the fluid pressure has dropped to the ambient fluid pressure.

5. Apparatus for printing images carried by a transparency web to form corresponding images on a web of photosensitive print material, which comprises:
   an exposure station,
   a rotating cylinder at least partially immersed in a liquid for supporting said webs and carrying them in close contact and at a uniform speed in a path past said exposure station,
   means for first guiding said print material onto said rotating cylinder to meet the surface thereof above the surface of said liquid and for bringing said transparency web into overlying relationship with said print material on said rotating cylinder so that the web of print material is overlaid by the transparency web for a sufficient length of lap to locate them relative to one another and to said exposure station over which they pass while in the liquid, and to produce a liquid interlayer between the two webs, and means including an apertured pad through which liquid is forced for applying a fluid pressure to press said two webs together, said pad being located along the path of travel of said webs at a position after they have been brought together but before said exposure station.

6. Apparatus according to claim 5 wherein said transparency web is so guided that it approaches said rotating cylinder, which is already lapped by the web of print material, tangentially thereto under the liquid surface.

7. Apparatus according to claim 5 wherein the means for applying said fluid pressure is an apertured pad from which fluid is forced onto the web surface.

8. Apparatus according to claim 5 wherein the fluid pressure is applied by said pad to the overlapping webs at or just after the tangent point where said two webs start to overlap each other.

9. Apparatus according to claim 8 wherein said pad has a surface substantially parallel to the surface of said cylinder at or just after said tangent point, said pad being positioned close to the overlapping webs.

10. Apparatus according to claim 9 wherein the apertures of the pad are so arranged on the surface of the pad that they form a rectangular figure, which in operation encloses a body of fluid under pressure.

11. Apparatus according to claim 10 wherein said apertures are so aligned that fluid streams are directed therefrom inwardly towards the enclosed fluid body under pressure.

12. Apparatus according to claim 11 wherein said apertures are so aligned that, in operation, the fluid pressure rises steeply at the entry boundary of the enclosed fluid body, remains substantially constant for a distance and then gradually drops at the exit boundary.

13. Apparatus according to claim 12 wherein the exposure station is disposed under the liquid and is located at a position where, in operation, the fluid pressure on the overlapping webs has dropped to the ambient fluid pressure.

References Cited
UNITED STATES PATENTS

| | | | |
|---|---|---|---|
| 3,161,120 | 12/1964 | Timares | 355—90 |
| 3,468,606 | 9/1969 | Wolf et al. | 355—91 |
| 3,488,121 | 1/1970 | Dassonville | 355—111 X |

SAMUEL S. MATTHEWS, Primary Examiner

R. L. MOSES, Assistant Examiner

U.S. Cl. X.R.
355—91, 111